Patented Jan. 5, 1943

2,307,081

UNITED STATES PATENT OFFICE 2,307,081

FILM

James E. Snyder, Akron, Ohio, assignor to Wingfoot Corporation, Wilmington, Del., a corporation of Delaware No Drawing. Application September 19, 1941, Serial No. 411,510

2 Claims. (Cl. 18—57)

This invention relates to a new rubber hydrochloride film and the method of producing the same. The film is an opaque or translucent film made of rubber hydrochloride, preferably transparent rubber hydrochloride, coated with an opaque or translucent coating of wax.

Various difficulties have arisen in the use of rubber hydrochloride film for packaging process cheese. One difficulty has been that the film does not adhere tightly to the cheese but separates from the cheese and upon slicing permits the air to attack the surface of the unsliced portion of the cheese with resultant formation of mold and excessive surface drying. It has been found that the cheese will adhere to a wax coated film, and the use of such film for packaging cheese is a part of the present invention.

The use of wax in rubber hydrochloride film is not new. For example, a film to which 1½% of paraffin wax had been added was available on the market prior to the present invention. This much paraffin is not entirely compatible with rubber hydrochloride film. A part of the wax "blooms" to the surface forming a thin coating of wax. This film was no improvement over wax-free film for packaging process cheese. It separates from the cheese as ordinary rubber hydrochloride film separates from such cheese, particularly in cutting a slice off the end of the wrapped package, and the surface of the unsliced cheese thus exposed to the air became coated with mold. It was found that by using a larger amount of wax and particularly by using an amorphous wax, enough to make the film translucent or even opaque, the wax surface became bonded to the cheese and adhered to the cheese and prevented the air from gaining access to the cheese with the resultant formation of mold. It is such a wax coated film to which the present invention relates.

In forming the film of this invention the wax is added to the cement or solution of rubber hydrochloride from which the film is cast. Various waxes have given satisfactory results. Paraffin wax may be used but better results are obtained with an amorphous wax. For example, 20 to 30% of beeswax, 20 to 35% of Syncera wax, 20 to 40% of Cerese wax, 20 to 40% of Petrowax "A" (manufactured by Biwax Corporation, Chicago, Illinois) and 10 to 40% of "SS" amorphous wax, made by National Wax Company of Chicago, have all given satisfactory results. The rubber hydrochloride cement containing any of these waxes in the specified amount, or an equivalent wax, is cast on the film-forming surface, and on evaporation of the solvent it is found that wax has bloomed out onto the surface. Usually more wax blooms out onto the under surface of the rubber hydrochloride film adjacent the casting surface, than on the opposite surface. The wax blooms out to such an extent that it forms a thin coating on the film which renders the film translucent or even opaque. The rubber hydrochloride of the film is saturated or super-saturated with the wax at room temperatures.

In packaging process cheese in rubber hydrochloride film, it has been customary to make a bag of the film and run the hot, plastic cheese into the bag. The bag made with the rubber hydrochloride film of this invention is preferably made up with the wax coating on the interior surface. When the hot process cheese is run into this bag it melts or softens the wax and as the air is excluded the wrapper becomes transparent. After cooling, the rubber hydrochloride film remains transparent. It is bonded to the cheese so that the air is excluded from the package, and the formation of mold is thus prevented. The bond between the film and cheese is such that when the cheese is used in the home, a slice of the cheese may be cut from the brick from time to time, cutting through the film as well as the cheese, without the film wrapper becoming separated from the cheese. Using uncoated rubber hydrochloride film the film has become separated from the cheese when so sliced, so that in a relatively short time the surface of the cheese has become moldy inside the rubber hydrochloride wrap. When cheese is packaged in the improved wrapper of this invention it may be kept in the ordinary home refrigerator and sliced from time to time without separation of the film from the cheese and thus be kept free from mold.

The waxed wrapper is grease-proof. It cuts more easily than a wrapper of pure rubber hydrochloride. The wax increases the moisture-proofness of the film and acts as a plasticizing agent imparting durability to the wrap. The wrapper may be printed, and is usually printed on the side which is freest from wax.

In practice it has been found preferable to use film which is about 0.0008 to 0.0017 inch thick for one pound packages of process cheese. Thinner gauges may be used for smaller units. Instead of using a bag of single ply film for packaging the cheese, a duplex bag may be used. The inner ply will then be the wax impregnated and coated film with the side covered with the heaviest coating of wax being placed adjacent the cheese. The outer ply may be, for example, a rubber hydrochloride film which is free from wax and plasticized with butyl stearate or the like to increase its tear resistance as disclosed in Calvert United States Patent No. 2,153,954.

Although the wax coated film has been developed particularly for the wrapping of cheese, it may be used for other purposes, such as the packaging of butter, cream cheese, lard, soap, cigarettes, etc.

This application is in part a continuation of my application Serial No. 357,762, filed September 21, 1940, which relates to the use of the film of this invention in packaging cheese.

What I claim is:

1. The method of making rubber hydrochloride film which comprises dissolving in a rubber hydrochloride cement more wax than is compatible with the rubber hydrochloride, casting the resulting cement to form a film therefrom and evaporating solvent so as to produce a film which has a coating of wax on the surface from which the solvent has evaporated.

2. A rubber hydrochloride film saturated with wax and coated on one side with a thin coating of the wax and on the other side with a heavier coating of the wax.

JAMES E. SNYDER.